(12) United States Patent
Lee et al.

(10) Patent No.: US 7,295,428 B2
(45) Date of Patent: Nov. 13, 2007

(54) SWING-TYPE PORTABLE DIGITAL COMMUNICATION APPARATUS AND SWING HINGE DEVICE THEREOF

(75) Inventors: Seung-Hwan Lee, Gumi-si (KR); Sung-Il Kang, Gumi-si (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 61 days.

(21) Appl. No.: 10/942,141

(22) Filed: Sep. 16, 2004

(65) Prior Publication Data
US 2005/0094360 A1    May 5, 2005

(30) Foreign Application Priority Data
Oct. 31, 2003   (KR)   ............... 10-2003-0076889

(51) Int. Cl.
*H05K 5/00*   (2006.01)
(52) U.S. Cl. ...................... 361/679; 361/681
(58) Field of Classification Search ......... 361/679–686
See application file for complete search history.

(56) References Cited

U.S. PATENT DOCUMENTS 5,485,517 A * 1/1996 Gray .................... 379/433.13
D505,407 S * 5/2005 Itano ........................ D14/138
6,961,593 B1 * 11/2005 Lonka et al. ............... 455/573
2005/0125570 A1 * 6/2005 Olodort et al. ............... 710/15

FOREIGN PATENT DOCUMENTS

CN           1411253        6/2002
WO      WO 03/047218      11/2002

* cited by examiner

*Primary Examiner*—Yean-Hsi Chang
(74) *Attorney, Agent, or Firm*—Roylance, Abrams, Berdo & Goodman LLP

(57) ABSTRACT

Disclosed are a swing-type portable digital communication terminal and a swing hinge device thereof. The portable digital communication apparatus comprises a main housing; a swing housing, which is in contact with the main housing in an initial state of the swing housing, the swing housing having a free end which becomes distant from the main housing when the swing housing is rotated around a first hinge axis, the swing housing being pushed by a force causing the swing housing to be automatically rotated around a second hinge axis and located in a final and inclined position of the swing housing when the swing housing has been rotated beyond a predetermined degree around the first hinge axis; and a swing hinge device mounted in the main housing and in close contact with a lower surface of the swing housing, so as to provide the force for rotating the swing housing into the inclined position of the swing housing.

21 Claims, 9 Drawing Sheets

SWING-TYPE PORTABLE DIGITAL COMMUNICATION APPARATUS AND SWING HINGE DEVICE THEREOF

PRIORITY

This application claims the benefit under 35 U.S.C. § 119(a) of an application entitled "SWING-TYPE PORTABLE DIGITAL COMMUNICATION APPARATUS AND SWING HINGE DEVICE THEREOF" filed with the Korean Intellectual Property Office on Oct. 31, 2003 and assigned Serial No. 2003-76889, the entire contents of which are incorporated herein by reference.

BACKGROUND OF THE INVENTION

1. Field of the Invention

The present invention relates to portable communication apparatuses, such as cellular phones, personal digital assistants (PDAs), hand held phones (HHPs), camera phones, game phones, and digital communication apparatuses, and more particularly to a portable digital communication apparatus which is opened or closed through double swing operations.

2. Description of the Related Art

A "portable communication apparatus" refers to an electronic apparatus which a user can carry to perform wireless communication with a desired partner. In consideration of portability, designs of such portable communication apparatuses are geared not only toward compactness, slimness, and lightness, but also toward multimedia availability. In particular, future portable communication apparatuses are expected to incorporate greater multi-functionality and multi-purpose utilization, as well as greater compactness and lightness, but also will likely be modified to be suitable for various multimedia environments or Internet environments. Additionally, such portable communication apparatuses are now commonly used by all kinds of people, including men and women, and the young and the old, throughout the world, and are recognized by some people as a nearly indispensable commodity which must always be carried.

Conventional portable communication apparatuses are classified as various types according to their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip which is pivotably mounted to a bar-shaped housing by a hinge unit. The folder-type portable communication apparatus has a folder coupled to a single bar-shaped housing by a hinge unit in such a manner that the folder can be rotated in order to be folded to or unfolded from the housing.

Further, portable communication apparatuses are classified as neck communication apparatuses according to the position at or the way in which a user puts on the communication apparatus. The neck wearable type communication apparatus is one which a user wears around their neck using a string, while the wrist wearable type communication apparatus is one which a user wears around their wrist.

Additionally, portable communication apparatuses are classified as rotation-type communication apparatuses and sliding-type communication apparatuses according to ways of opening and closing the communication apparatuses. In the rotation-type portable communication apparatus, two housings are coupled to each other in such a manner that one housing rotates to be opened or closed relative to the other while they face each other. In the sliding-type portable communication apparatus, two housings are coupled to each other in a manner that one housing slides in order to be opened or closed relative to the other housing. The different types of portable communication apparatuses can be easily understood by those skilled in the art.

Meanwhile, conventional portable communication apparatuses now tend to have a function of transmitting data at a high speed in addition to performing the basic function of performing voice communication. In other words, according to the increase of demand by consumers, portable communication apparatuses now tend to provide a service using a wireless communication technology capable of transmitting data at a high speed.

Recently portable communication apparatuses now tend to be equipped with a camera lens which enables each of the communication apparatuses to transmit an image signal. That is, current conventional portable communication apparatuses may have an imbedded or external camera lens or a photographing means which enables a user to communicate images with a desired partner or to take a photograph of a desired subject.

Hereinafter, from among the various conventional portable communication apparatuses, a conventional swing-type portable digital communication terminal will be described.

As shown in FIGS. 1 and 2, a conventional swing-type portable digital communication terminal includes a first housing 410 and a second housing 420 rotatably assembled with each other through a hinge module (not shown). The second housing 420 is opened from or closed onto the first housing 410 through swing operation. The first housing 410 and the second housing 420 are kept in contact with each other and swing around a hinge axis A within a range of about 180°.

The first housing 410 has a first key array 411 and a microphone unit 412 adjacently disposed on a surface of the first housing 410. The first key array 411 includes a plurality of keys orderly arranged in a group. The second housing 420 has a speaker unit 421, a display unit 422, and a second key array 423, which are adjacently disposed in sequence on a surface of the second housing 420. The second key array 423 includes a plurality of keys orderly arranged in a group.

When the second housing 420 has completely swung 180° from the first housing 410 as shown in FIG. 2, it is somewhat inconvenient or troublesome for a user to confirm data displayed on the display unit 422. That is, a user must tilt the entire body of the portable communication apparatuses at a desired angle in order to look at the data displayed on the display unit 422.

SUMMARY OF THE INVENTION

Accordingly, the present invention has been made to solve the above-mentioned problems occurring in the prior art, and an object of the present invention is to provide a swing-type portable digital communication terminal and a swing hinge device thereof, which enable a user to more easily look at data displayed on the terminal.

Another object of the present invention is to provide a swing-type portable digital communication terminal and a swing hinge device thereof, the digital communication terminal having a swing housing which is completely opened through double swing operations.

In order to accomplish this object, there is provided a swing-type portable digital communication apparatus. The apparatus comprises a main housing; a swing housing, which is in contact with the main housing in an initial state of the swing housing, the swing housing having a free end which becomes distant from the main housing when the swing housing is rotated around a first hinge axis, the swing housing being pushed by a force causing the swing housing to be automatically rotated around a second hinge axis and located in a final and inclined position of the swing housing when the swing housing has been rotated beyond a predetermined degree around the first hinge axis; and a swing hinge device mounted in the main housing and in close contact with a lower surface of the swing housing to provide the force for rotating the swing housing into the inclined position of the swing housing.

In accordance with another aspect of the present invention, there is provided a swing-type portable digital communication apparatus. The apparatus comprises a main housing; a swing housing, which is rotated in a first swing direction while being in contact with the main housing and is then rotated in a second swing direction until the swing housing is slantingly positioned on the main housing; and a swing hinge device providing a first hinge axis and a second hinge axis, which serve as central axes for rotation of the swing housing in the first swing direction and the second swing direction, respectively, the first hinge axis and the second hinge axis intersecting perpendicularly to each other.

In accordance with another aspect of the present invention, there is provided a swing hinge device of a swing-type portable digital communication apparatus which includes a main housing and a swing housing in addition to the swing hinge device, the swing housing being opened and closed through swing operations while being in contact with the main housing, the swing hinge device connecting the main housing and the swing housing with each other in such a manner that the swing housing can be rotated around a first hinge axis. The swing hinge device comprises a first hinge housing assembled with the main housing; a first hinge shaft held in the first hinge housing in such a manner that the first hinge shaft can rotate about the first hinge axis; a second hinge housing assembled with the swing housing and opposed to the first hinge housing, the second hinge housing having an inclined surface portion; a second hinge shaft held in the second hinge housing in such a manner that the second hinge shaft can rotate about the first hinge axis, the second hinge shaft being hingedly assembled with the first hinge shaft by a hinge pin in such a manner that the second hinge shaft can rotate about the second hinge axis; and an elastic assembly received in the first hinge housing and providing an elastic force in a direction parallel to the first hinge axis.

BRIEF DESCRIPTION OF THE DRAWINGS

The above and other objects, features and advantages of the present invention will be more apparent from the following detailed description taken in conjunction with the accompanying drawings, in which.

Throughout the drawings, it should be noted that the same or similar elements are denoted by like reference numerals.

DETAILED DESCRIPTION OF THE PREFERRED EMBODIMENTS

Embodiments of the present invention will now be described with reference to the accompanying drawings. In the following description of the present invention, a detailed description of known functions and configurations incorporated herein will be omitted for conciseness.

Figure 1:
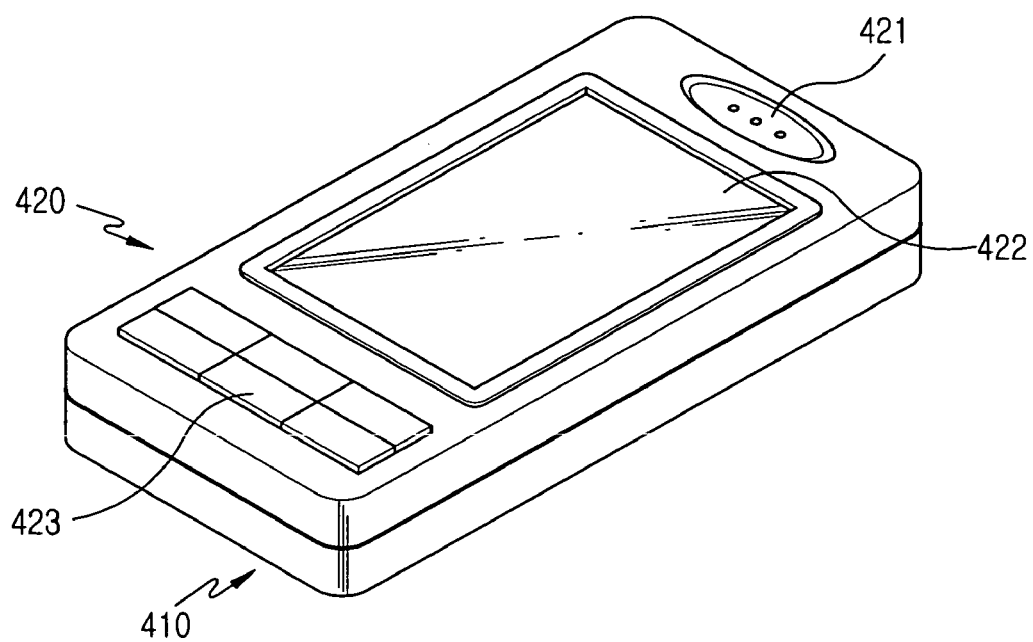
FIG. 1 is a perspective view of a conventional swing-type portable digital communication terminal.
Figure 2:
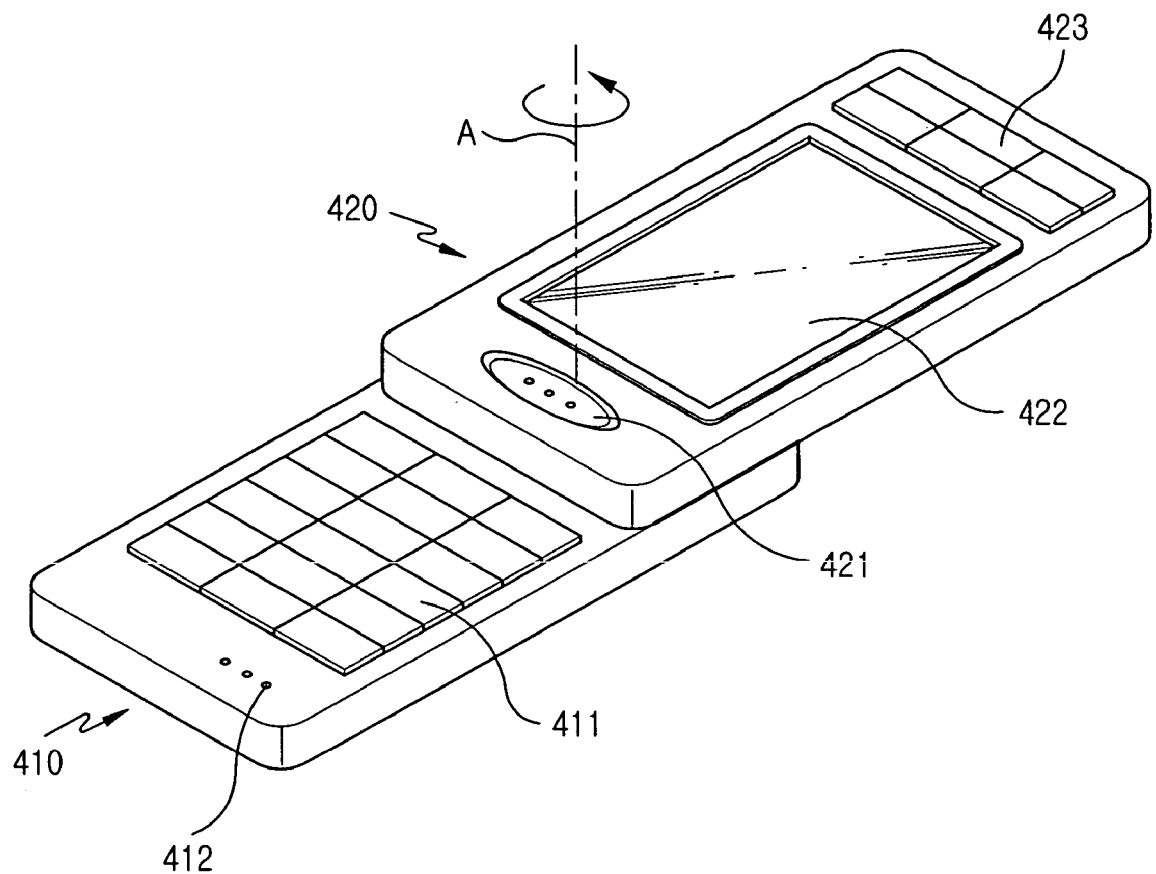
FIG. 2 is a perspective view of the portable digital communication terminal shown in FIG. 1, in which a swing housing thereof has been completely rotated to 180°.
Figure 3:
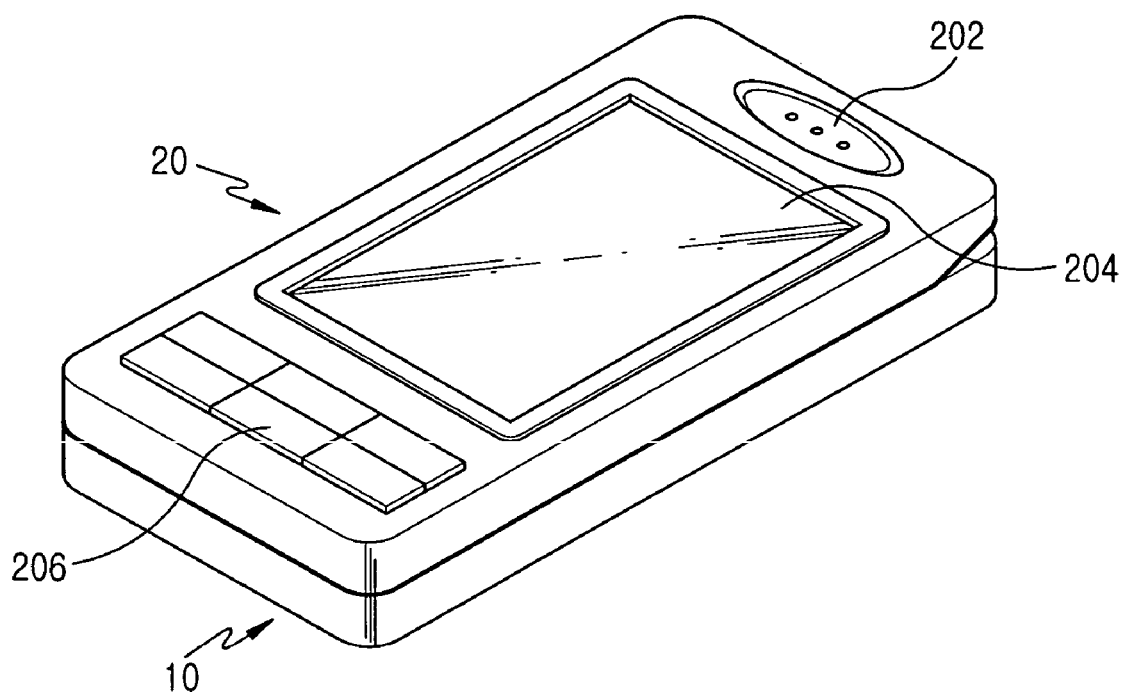
FIG. 3 is a perspective view of a swing-type portable digital communication terminal according to an embodiment of the present invention.
Figure 4:
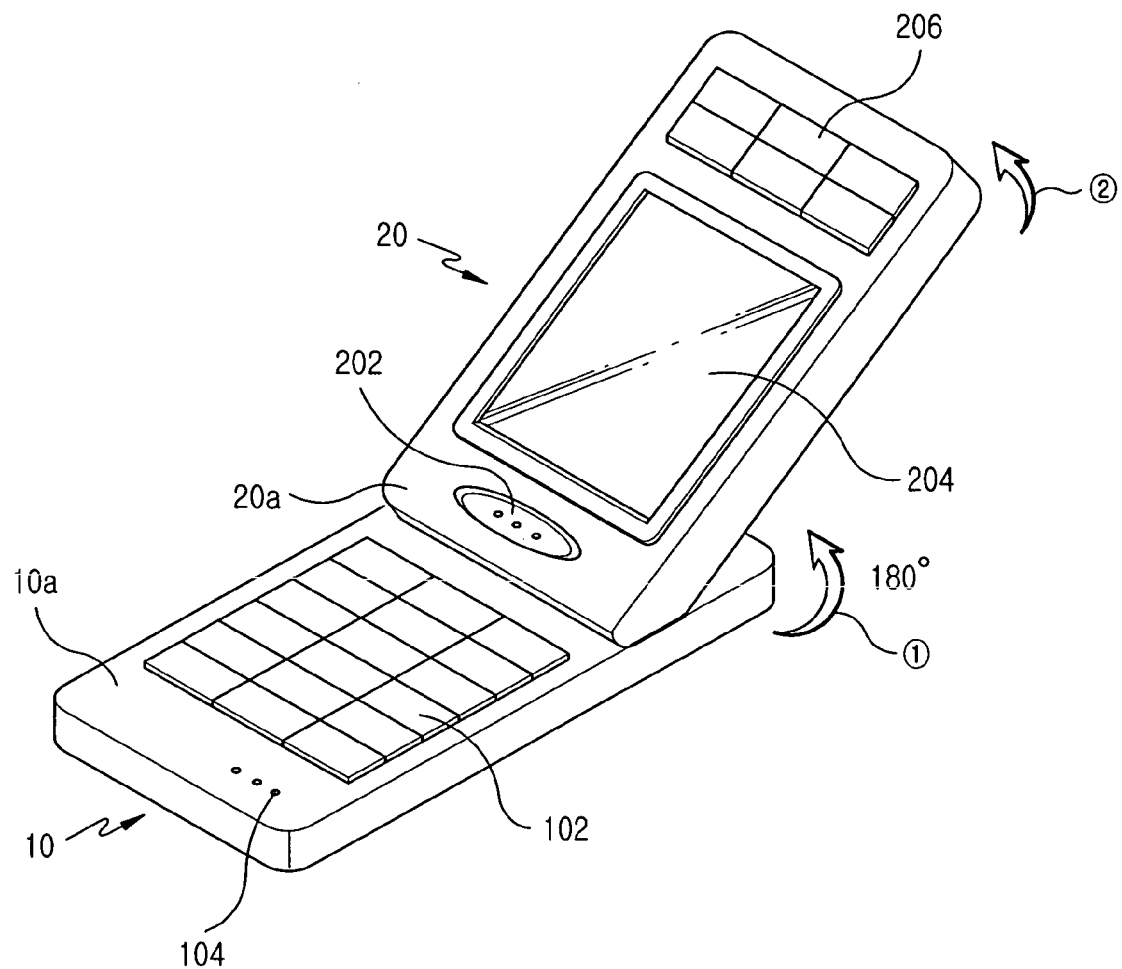
FIG. 4 is a perspective view of the portable digital communication terminal shown in FIG. 3, in which a swing housing thereof has been completely rotated around a second hinge axis after being rotated 180° around a first hinge axis.

As shown in FIGS. 3 and 4, a portable digital communication terminal according to an embodiment of the present invention includes a main housing 10, a swing housing 20, and a swing hinge device. The swing hinge device rotatably connects the main housing 10 and the swing housing 20 with each other. The swing hinge device will described later in more detail.

The main housing 10 has a shape of a plate or bar and includes a first key array 102 and a microphone unit 104, which are adjacently disposed on an upper surface 10a of the main housing 10. The first key array 102 includes a plurality of keys orderly arranged in a group.

The swing housing 20 has a shape of a plate or bar and includes a speaker unit 202, a display unit 204, and a second key array 206, which are adjacently disposed in sequence on an upper surface 20a of the swing housing 20. The second key array 206 includes a plurality of keys orderly arranged in a group. Preferably, the swing housing 20 has a slant surface 20c (see FIG. 5A) which forms a rear portion of a lower surface 20b (see FIG. 5B) of the swing housing 20 and is inclined at a predetermined angle. Herein, when the swing housing 20 is not rotated but is kept in its initial position, the slant surface 20c is linearly inclined such that the distance between the slant surface 20c of the swing housing 20 and the upper surface 10a of the main housing 10 increases as it approaches the back of the swing housing 20. The slant surface 20c of the swing housing 20 comes into contact with the upper surface 10a of the main housing 10 when the swing housing 20 has experienced double swing operations (see FIG. 5C). Further, the display unit 204 may employ one of a Liquid Crystal Display (LCD), a touchscreen, and a hologram screen.

In a closed state, the upper surface 10a of the main housing 10 and the lower surface 20b of the swing housing 20 are in contact with each other as shown in FIG. 3. When the swing housing 20 has been rotated a predetermined angle from the closed state, the swing housing 20 becomes inclined at a predetermined angle as shown in FIG. 4. This state enables a user to more easily confirm data displayed on the display unit 204.

Figure 5A:
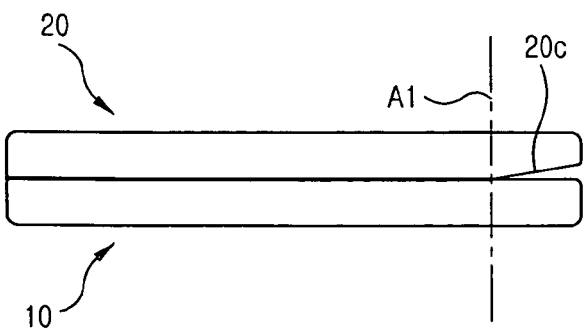
FIGS. 5A through 5C are side views of a swing-type portable digital communication terminal according to an embodiment of the present invention, for showing a process in which the swing housing is opened.
Figure 5B:
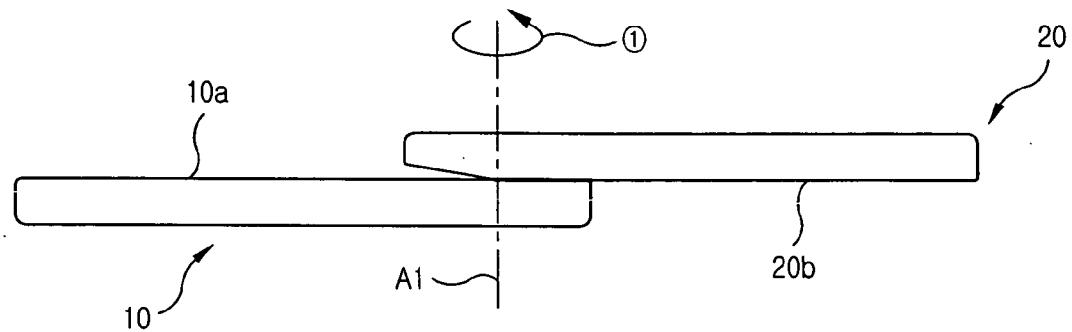
Figure 5C:
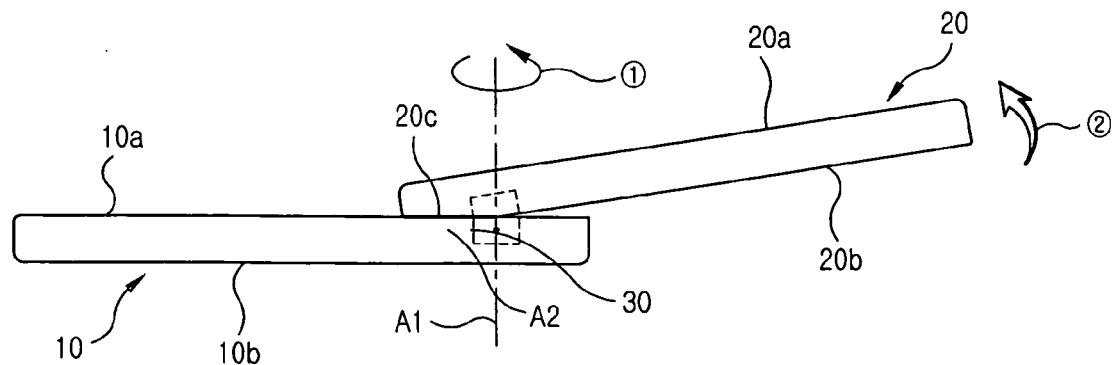

Specifically, as shown in FIGS. 5A through 5C, the communication terminal according to an embodiment of the present invention includes the main housing 10, the swing housing 20, and a swing hinge device 30. The swing housing 20 is in contact with the main housing 10 in its initial state. When the swing housing 20 is rotated around the first hinge axis A1 in a first swing direction (indicated by arrow ①), a free end of the swing housing 20 becomes distant from the main housing 10. When the swing housing 20 has been rotated beyond a predetermined degree, force is applied to the swing housing 20, thereby causing the swing housing 20 to be automatically rotated in a second swing direction (indicated by arrow ②) until the swing housing 20 is located in its final and inclined position. The swing hinge device 30 is mounted in the main housing 10 and is in close contact with the lower surface 20b of the swing housing 20. The swing hinge device 30 provides the force for rotating the swing housing 20 into the inclined position of the swing housing 20.

The swing hinge device 30 applies the above-mentioned force in a vertically upward direction and is in close contact with the lower surface 20b or the slant surface 20c of the swing housing 20, thereby providing the swinging force in the second swing direction in order to slantingly position the swing housing 20. Further, the swing hinge device 30 provides a first hinge axis A1 for the first swinging operation of the swing housing 20 and a second hinge axis A2 for the second swinging operation of the swing housing 20. The first hinge axis A1 and second hinge axis A2 intersect perpendicularly to each other. In other words, the swing hinge device 30 functions as a "biaxial swing hinge module".

Herein, the swinging force in the direction indicated by arrow ① is provided by manual force, and the swinging force in the direction indicated by arrow ② is automatically provided by the swing hinge device 30.

Hereinafter, the swing hinge device 30 employed in a swing-type portable digital communication terminal according to an embodiment of the present invention will be described in detail with reference to FIGS. 6 and 7.

Figure 6:
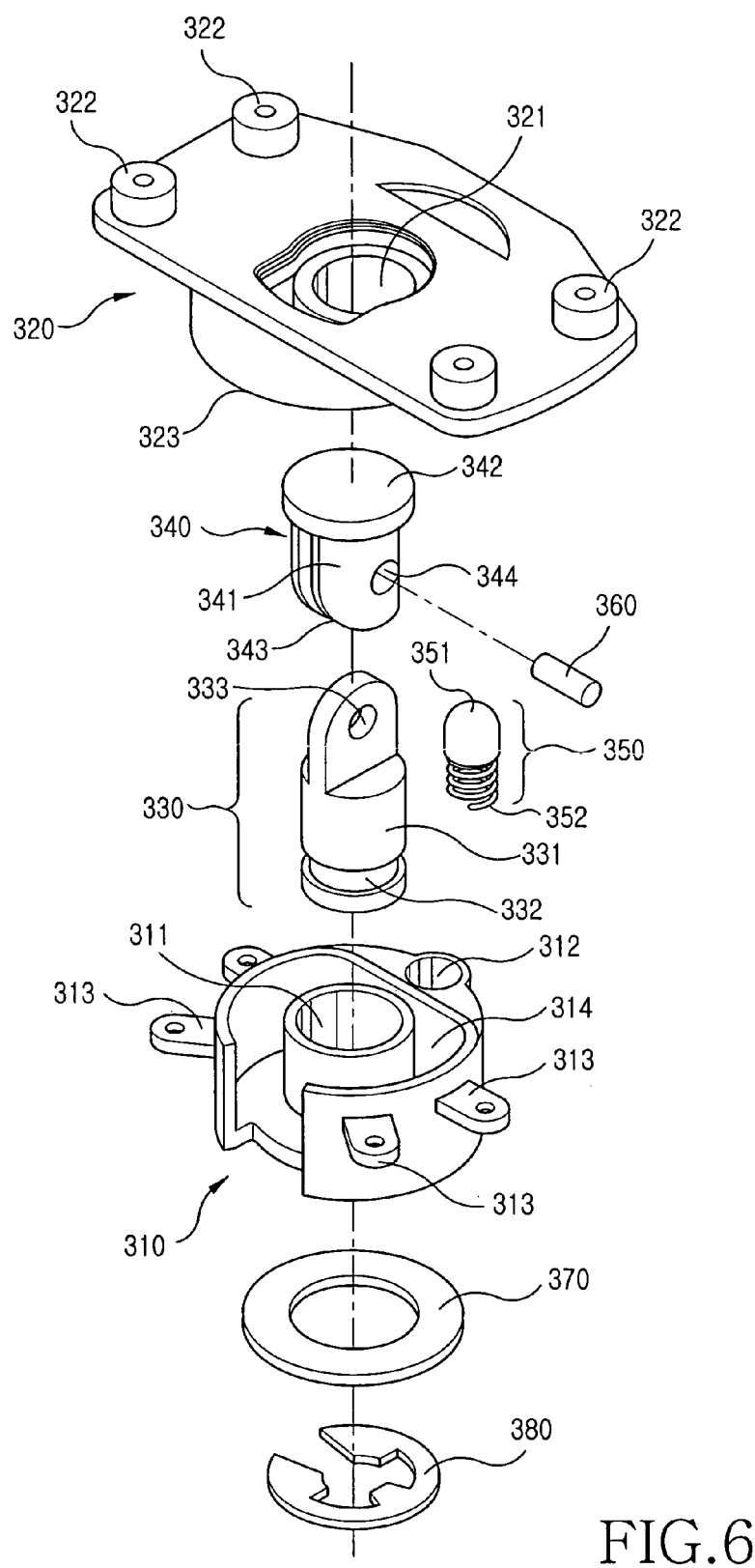
FIG. 6 is an exploded perspective view of a swing hinge device employed in a swing-type portable digital communication terminal according to an embodiment of the present invention.
Figure 7:
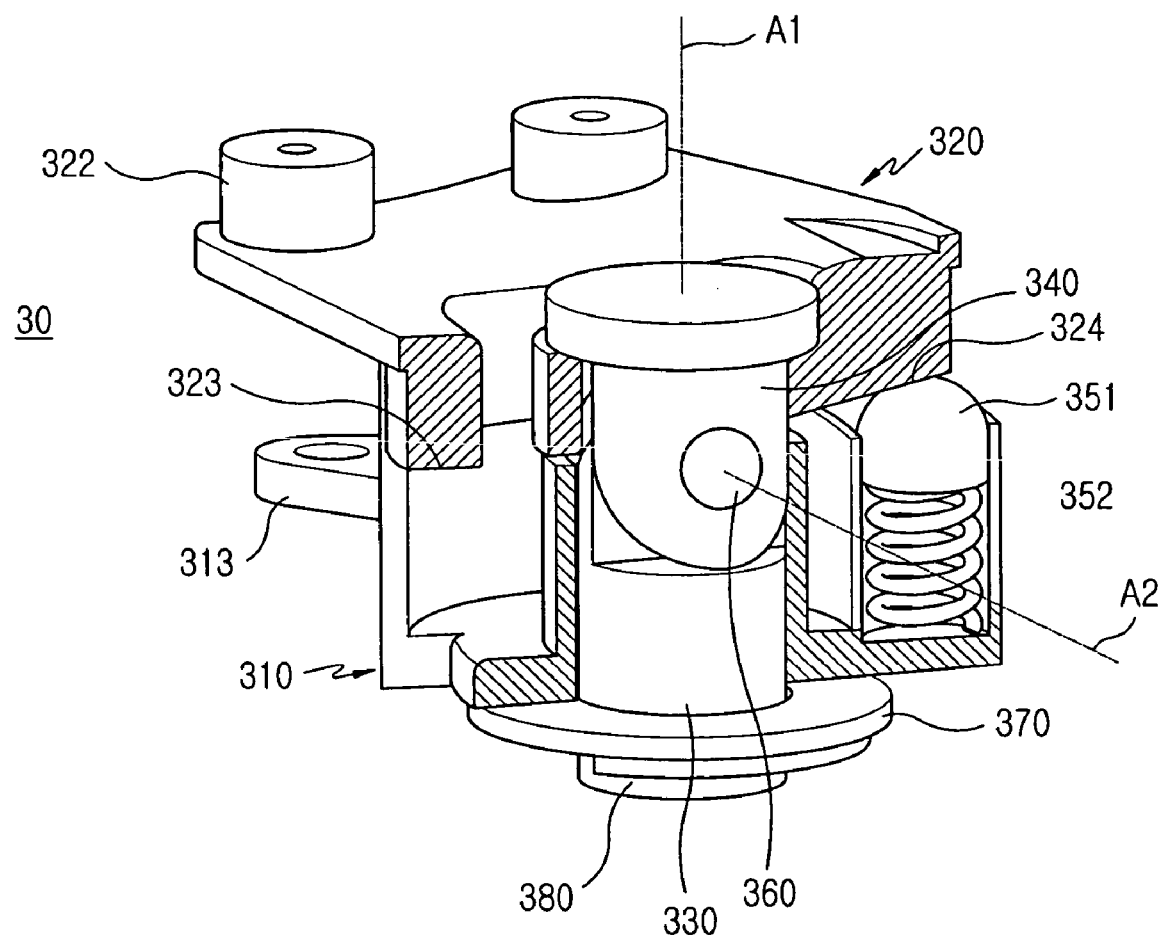
FIG. 7 is a partly cut-off perspective view of an assembled swing hinge device employed in a swing-type portable digital communication terminal according to an embodiment of the present invention.

As shown in FIGS. 6 and 7, the swing hinge device 30 according to an embodiment of the present invention includes a first hinge housing 310, a second hinge housing 320, a first hinge shaft 330, a second hinge shaft 340, and an elastic assembly 350. The first hinge housing 310 is assembled with the main housing 10. The first hinge shaft 330 is held in the first hinge housing 310 in such a manner that the first hinge shaft 330 can rotate about the first hinge axis A1. The second hinge housing 320 is assembled with the swing housing 20 and opposes the first hinge housing 310. The second hinge housing 320 has an inclined surface portion 324 (see FIG. 7). The second hinge shaft 340 is held in the second hinge housing 320 in such a manner that the second hinge shaft 340 can rotate about the first hinge axis A1. The second hinge shaft 340 is hingedly assembled with the first hinge shaft 330 by a hinge pin 360 in such a manner that the second hinge shaft 340 can rotate about the second hinge axis A2 or the hinge pin 360. The elastic assembly 350 is received in the first hinge housing 310 and provides an elastic force in a direction parallel to the first hinge axis A1 (vertically upward).

The first hinge housing 310 has a plurality of assembling brackets 313 protruding outward from a cylindrical outer surface of the first hinge housing 310, which are assembled with the main housing 10. The first hinge housing 310 has a cylindrical first hinge shaft hole 311 for seating the first hinge shaft 330 and the second hinge shaft 340 therein, which is formed at a central portion of the first hinge housing 310. Also, the first hinge housing 310 has an elastic assembly hole 312 in which the elastic assembly 350 is seated.

The second hinge housing 320 has a plurality of assembling protrusions 322 protruding upward from an upper surface of the second hinge housing 320, which are assembled with the swing housing 20. A lower surface of the second hinge housing 320 includes a flat surface portion 323 and an inclined surface portion 324. Of course, the inclined surface portion 324 of the second hinge housing 320 is inclined to the same angle as the slant surface 20c of the swing housing 20.

Preferably, the elastic assembly 350 includes a push bulb 351 and a coil spring 352. The push bulb 351 preferably has a semispherical shape. The coil spring 352 provides an opposing elastic force to the push bulb 351.

The first hinge shaft 330 has a first hinge shaft body 331, a ring groove 332, and a first hinge pin hole 333. An E-ring 380 is fitted around the ring groove 332, so as to enable the first hinge shaft 330 to be assembled with the first hinge housing 310. The second hinge shaft 340 has two second hinge shaft shanks 341 and a second hinge shaft head 342 formed integrally with each other. The second hinge shaft shanks 341 oppose each other and extend in parallel to each other with a predetermined gap between them. Each of the second hinge shaft shanks 341 has a semi-cylindrical outer surface and a second hinge pin hole 344 formed through a central portion of the second hinge shaft shank 341. The second hinge pin holes 344 of the two second hinge shaft shanks 341 are aligned with each other. The second hinge shaft head 342 is integrally formed with upper ends of the second hinge shaft shanks 341. The second hinge shaft head 342 is fitted in and held by the second hinge housing 320. In a state in which an upper portion of the first hinge shaft 330 is inserted in the gap between the second hinge shaft shanks 341, the first hinge pin hole 333 is aligned with the second hinge pin holes 344. Then, the hinge pin 360 is inserted through the second hinge pin hole 344, the first hinge pin hole 333, and the second hinge pin hole 344, so that the first hinge shaft 330 and the second hinge shaft 340 are hingedly assembled with each other. Preferably, the second hinge shaft 340 has a round lower end 343.

Reference numerals 370 and 321 designate a washer and a second hinge shaft hole for seating the second hinge shaft shanks 341 therein, respectively.

Hereinafter, an operation of the swing hinge module according to an embodiment of the present invention will be described with reference to FIGS. 8A through 8D.

Figure 8A:
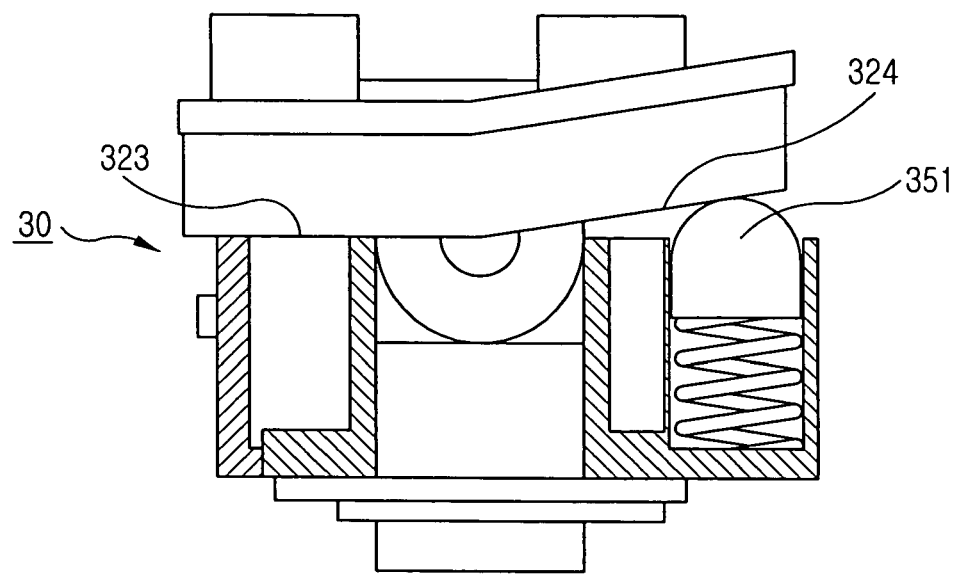
FIGS. 8A through 8D are side views of a swing hinge device according to an embodiment of the present invention, for showing the operation of the swing hinge device.
Figure 8B:
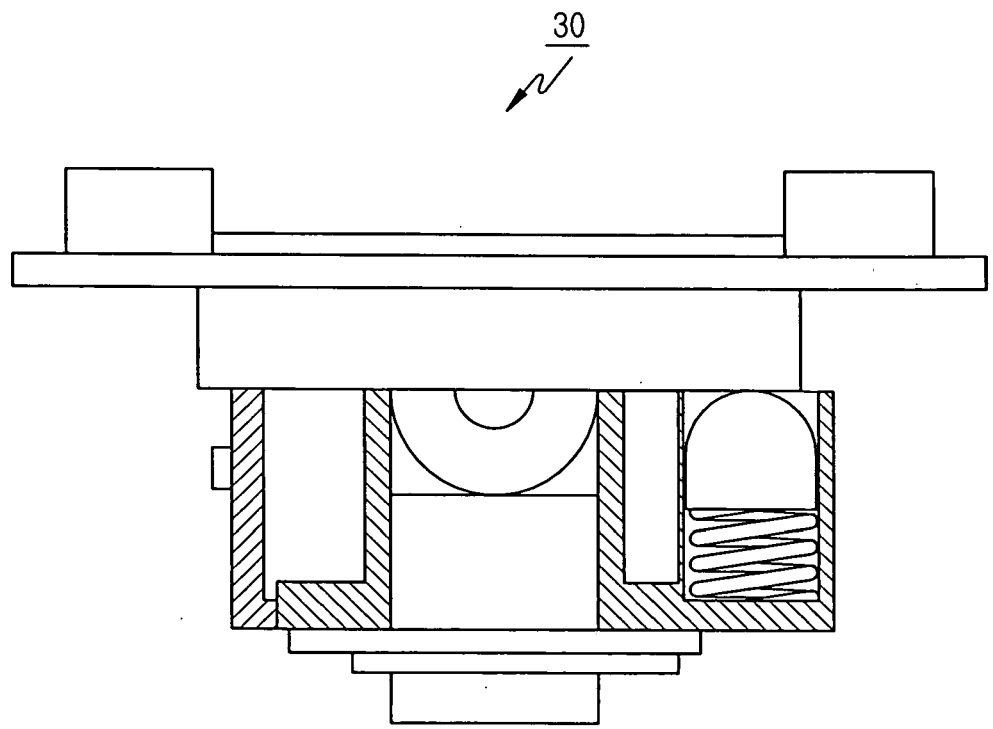
Figure 8C:
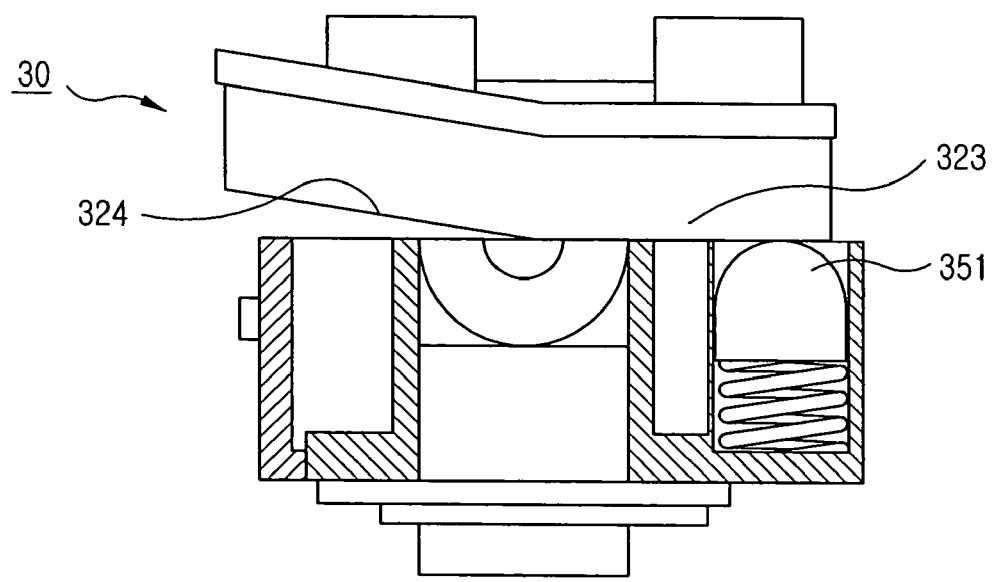
Figure 8D:
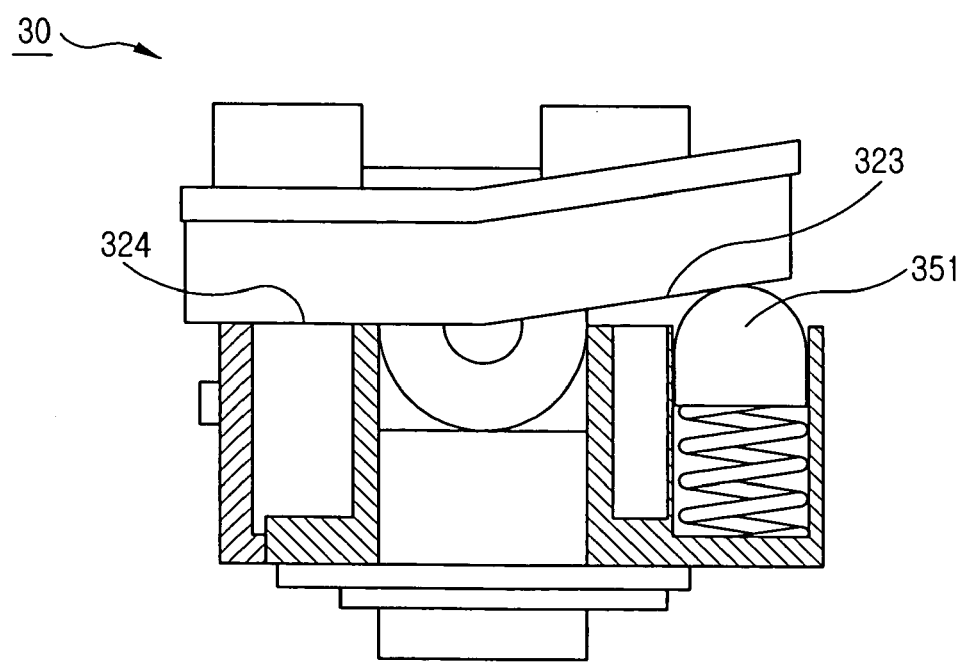

FIG. 8A is a sectional view of the swing hinge device 30 when the swing hinge device 30 is in a state as shown in FIG. 3. In this state, the inclined surface portion 324 of the second hinge housing 320 and the push bulb 351 are in close contact with each other by the coil spring 352. When the swing housing 20 has been rotated about 90° from the state shown in FIG. 8A, the swing hinge device 30 comes into a state as shown in FIG. 8B. Thereafter, as the degree by which the swing housing 20 has been rotated approaches 180°, the flat surface portion 323 of the second hinge housing 320 and the push bulb 351 are kept in close contact with each other by the coil spring 352. When the degree by which the swing housing 20 has been rotated reaches 180°, the swing housing 20 is rotated around the second hinge axis A2 by the elastic force of the coil spring 352 until the inclined surface portion 324 comes into contact with the upper surface 10a of the main housing 10 as shown in FIG. 8D. The final state of the swing housing 20 shown in FIG. 8D is also shown in FIG. 4.

Meanwhile, in the swing-type portable digital communication terminal according to an embodiment of the present invention, it is not indispensable for the lower surface of the swing housing to have only one inclined surface portion. Instead, the lower surface of the swing housing either may include at least two inclined surface portions or may be a round surface. In the case in which the lower surface of the swing housing includes two inclined surface portions, the swing housing will be automatically rotated around the second hinge axis in double steps while it is manually rotated 180° around the first hinge axis.

As described above, the embodiment of the present invention provides a swing-type portable digital communication terminal having a swing housing which is completely opened through double swing operations, thereby enabling a user to more easily look at data displayed on a display unit on the swing housing.

While the invention has been shown and described with reference to certain embodiments thereof, it should be understood by those skilled in the art that various changes in form and details may be made therein without departing from the spirit and scope of the invention as defined by the appended claims.

What is claimed is:

1. A swing-type portable digital communication apparatus comprising:
   a main housing;
   a swing housing, which is in contact with the main housing in an initial state of the swing housing, the swing housing having a free end which becomes distant from the main housing when the swing housing is rotated around a first hinge axis, the swing housing being pushed by a force causing the swing housing to be automatically rotated around a second hinge axis and located in a final and inclined position of the swing housing when the swing housing has been rotated beyond a predetermined degree around the first hinge axis; and
   a swing hinge device mounted in the main housing and in close contact with a lower surface of the swing housing to provide the force for rotating the swing housing into the inclined position of the swing housing.

2. The swing-type portable digital communication apparatus as claimed in claim 1, wherein each of the main housing and the swing housing comprises a plate or bar shape.

3. The swing-type portable digital communication apparatus as claimed in claim 1, wherein the swing housing has a slant surface which forms a rear portion of a lower surface of the swing housing and is inclined at a predetermined angle, the slant surface being inclined such that a distance between the slant surface of the swing housing and an upper surface of the main housing increases as it approaches the back of the swing housing when the swing housing is maintained in the initial position, the slant surface of the swing housing coming into contact with the upper surface of the main housing when the swing housing has experienced double swing operations.

4. The swing-type portable digital communication apparatus as claimed in claim 3, wherein the swing hinge device is disposed adjacent to the slant surface.

5. The swing-type portable digital communication apparatus as claimed in claim 1, wherein the main housing comprises a first key array and a microphone unit, which are adjacently disposed on an upper surface of the main housing, and the swing housing includes a speaker unit, a display unit, and a second key array, which are adjacently disposed in sequence on an upper surface of the swing housing, each of the first key array and the second key array including a plurality of keys orderly arranged in a group.

6. The swing-type portable digital communication apparatus as claimed in claim 1, wherein the swing hinge device applies the force in a vertical direction, thereby providing a swinging force for slantingly positioning the swing housing.

7. The swing-type portable digital communication apparatus as claimed in claim 1, wherein the swing hinge device provides the first hinge axis and the second hinge axis, around each of which the swing housing rotates.

8. The swing-type portable digital communication apparatus as claimed in claim 1, wherein the swing hinge device comprises a first hinge shaft for rotation of the swing housing around the first hinge axis and a second hinge shaft for rotation of the swing housing around the second hinge axis.

9. A swing-type portable digital communication apparatus comprising:
   a main housing;
   a swing housing, which is rotated in a first swing direction while being in contact with the main housing for a predetermined degree and is then rotated in a second swing direction until the swing housing is slantingly positioned on the main housing; and
   a swing hinge device providing a first hinge axis and a second hinge axis, which serve as central axes for rotation of the swing housing in the first swing direction and the second swing direction, respectively, the first hinge axis and the second hinge axis intersecting perpendicularly to each other.

10. The swing-type portable digital communication apparatus as claimed in claim 9, wherein the swing housing is manually rotated in the first swing direction while being automatically rotated in the second swing direction by the swing hinge device.

11. The swing-type portable digital communication apparatus as claimed in claim 9, wherein the swing housing has a slant surface formed at a predetermined portion of a lower surface of the swing housing, the slant surface enabling the swing housing to be rotated in the second swing direction.

12. The swing-type portable digital communication apparatus as claimed in claim 11, wherein the slant surface is inclined such that a distance between the slant surface of the swing housing and an upper surface of the main housing increases as it approaches the back of the swing housing when the swing housing is maintained in its initial position.

13. The swing-type portable digital communication apparatus as claimed in claim 9, wherein the swing hinge device comprises a first hinge shaft for rotation of the swing housing around the first hinge axis and a second hinge shaft for rotation of the swing housing around the second hinge axis.

14. A swing hinge device of a swing-type portable digital communication apparatus which includes a main housing and a swing housing in addition to the swing hinge device, the swing housing being opened and closed through swing operations while being in contact with the main housing, the swing hinge device connecting the main housing and the swing housing with each other in such a manner that the swing housing can be rotated around a first hinge axis, the swing hinge device comprising:

a first hinge housing assembled with the main housing;

a first hinge shaft held in the first hinge housing in such a manner that the first hinge shaft can rotate about the first hinge axis;

a second hinge housing assembled with the swing housing and opposed to the first hinge housing, the second hinge housing having an inclined surface portion;

a second hinge shaft held in the second hinge housing in such a manner that the second hinge shaft can rotate about the first hinge axis, the second hinge shaft being hingedly assembled with the first hinge shaft by a hinge pin in such a manner that the second hinge shaft can rotate about the second hinge axis; and an elastic assembly received in the first hinge housing and providing an elastic force in a direction parallel to the first hinge axis.

15. The swing hinge device of a swing-type portable digital communication apparatus as claimed in claim 14, wherein the elastic assembly comprises a push bulb and a coil spring, the push bulb comprising a semispherical shape, the coil spring applying an elastic force to the push bulb.

16. The swing hinge device of a swing-type portable digital communication apparatus as claimed in claim 14, wherein the second hinge shaft comprises a round lower end.

17. The swing hinge device of a swing-type portable digital communication apparatus as claimed in claim 14, wherein the first hinge shaft comprises a ring groove, around which an E-ring is fitted, so as to enable the first hinge shaft to be held by the first hinge housing, and the second hinge shaft comprises a second hinge shaft head fitted in and held by the second hinge housing.

18. The swing hinge device of a swing-type portable digital communication apparatus as claimed in claim 14, wherein the first hinge shaft further comprises a cylindrical elastic assembly hole in which the elastic assembly is seated.

19. The swing hinge device of a swing-type portable digital communication apparatus as claimed in claim 14, wherein the first hinge housing comprises a plurality of assembling brackets protruding outward from a cylindrical outer surface of the first hinge housing, which are assembled with the main housing, and the second hinge housing comprises a plurality of assembling protrusions protruding vertically upward from an upper surface of the second hinge housing, which are assembled with the swing housing.

20. The swing hinge device of a swing-type portable digital communication apparatus as claimed in claim 14, wherein the first hinge axis and the second hinge axis intersect perpendicularly to each other.

21. A swing-type portable digital communication apparatus comprising:

a main housing;

a swing housing; and a swing hinge device connecting the main housing and the swing housing such that the swing housing rotates in a first swing direction while contacting the main housing and, after the swing housing has been rotated beyond a predetermined degree in the first swing direction, the swing hinge device provides a force to automatically rotate the swing housing in a second swing direction, approximately perpendicular to the first swing direction, to a final and inclined position of the swing housing.

* * * * *